(12) United States Patent
Moorman

(10) Patent No.: US 7,815,016 B2
(45) Date of Patent: Oct. 19, 2010

(54) LUBRICATION CONTROL SYSTEM FOR AUTOMATIC TRANSMISSIONS

(75) Inventor: Steven P. Moorman, Dexter, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 249 days.

(21) Appl. No.: 12/036,651

(22) Filed: Feb. 25, 2008

(65) Prior Publication Data

US 2009/0211850 A1    Aug. 27, 2009

(51) Int. Cl.
*F16H 57/04* (2010.01)
*F01M 9/00* (2006.01)
*F16K 11/07* (2006.01)

(52) U.S. Cl. .................. 184/6.12; 475/159; 137/625.69

(58) Field of Classification Search ................ 184/6.12; 137/625.25, 625.29, 625.66, 625.67; 475/159
See application file for complete search history.

(56) References Cited

U.S. PATENT DOCUMENTS

| | | | | | |
|---|---|---|---|---|---|
| 4,064,970 | A | * | 12/1977 | Reeves ....................... | 184/15.3 |
| 4,275,617 | A | * | 6/1981 | Kalns .......................... | 475/136 |
| 4,354,527 | A | * | 10/1982 | McMillan .............. | 137/625.63 |
| 5,115,887 | A | * | 5/1992 | Smith ......................... | 184/6.4 |
| 5,217,085 | A | * | 6/1993 | Barrie et al. ............. | 184/104.1 |
| 5,347,886 | A | * | 9/1994 | Mainquist et al. ........... | 477/161 |
| 5,715,912 | A | * | 2/1998 | Maxwell et al. ............ | 184/6.26 |
| 5,749,439 | A | * | 5/1998 | Van Maanen ............. | 184/6.12 |
| 6,382,248 | B1 | * | 5/2002 | Long et al. ................... | 137/557 |
| 6,585,004 | B1 | * | 7/2003 | Porter ................... | 137/625.64 |
| 7,018,178 | B2 | * | 3/2006 | Hunter et al. ............... | 417/219 |
| 2002/0082131 | A1 | * | 6/2002 | Park et al. .................... | 475/127 |
| 2008/0257648 | A1 | * | 10/2008 | Lukas et al. .................. | 184/26 |

* cited by examiner

*Primary Examiner*—John Q Nguyen
*Assistant Examiner*—Robert T Reese

(57) ABSTRACT

An automatic transmission lubrication control system includes a modulating, spring biased spool valve and feedback circuit. One end of the spool valve is supplied with line pressure hydraulic fluid. The valve spool modulates a flow of lubricating hydraulic fluid from the cooler and its position is determined by a force balance between the line pressure, the regulated fluid output pressure to the lubrication system and the force of the biasing spring. In a reduced lubrication state, a signal from a transmission control module opens a solenoid valve to provide high pressure fluid to a three way check valve which closes the feedback circuit and applies high pressure fluid to the opposite end of the valve spool. This action moves the valve spool to a travel limit, closing off flow from the cooler. Hydraulic fluid from the torque converter feed is then routed to the lubrication system.

18 Claims, 4 Drawing Sheets

LUBRICATION CONTROL SYSTEM FOR AUTOMATIC TRANSMISSIONS

FIELD

The present disclosure relates to lubrication controls for automatic transmissions and more particularly to a lubrication control system for an automatic transmission which reduces lubrication flow under low speed and power conditions.

BACKGROUND

The statements in this section merely provide background information related to the present disclosure and may or may not constitute prior art.

In motor vehicle automatic transmissions, it is necessary to constantly provide a flow of lubricating transmission fluid to a significant number of rotating components. Determining the necessary lubrication flow which may also be defined as a minimum or sufficient flow for a given component or group of components is critical. Providing such necessary flow is a challenge since it must be maintained throughout the operating speed range of the transmission. Accordingly, flow control devices such as orifices and passageways are sized to provide sufficient flow at high RPM in spite of the fact that, so sized, they will provide excessive flow at low RPM. While this worst case engineering solution fully satisfies the lubrication requirement, an acknowledged consequence is that energy is wasted providing the unnecessarily high flow at low RPM. Specifically, such excess flow causes increased parasitic losses from the internal components of the transmission such as open clutches, bearings, bushings, rotating shells and the like. These parasitic losses result in increased fuel consumption.

It goes without saying that a design arrived at through compromise is more problematic. Attempting to find a middle ground between minimum necessary flow at high RPM and excessive flow at low RPM will, in all likelihood, result in components at least marginally starved for lubrication at high RPM which may compromise performance and service life.

The foregoing summary of the state of the automatic transmission lubrication art suggests that improvements in this art would be desirable and the present invention is so directed.

SUMMARY

The present invention provides an automatic transmission lubrication control system having a modulating, spring biased spool valve and a feedback circuit. One end face of the spool valve is supplied with line pressure hydraulic fluid. In a first operating state, the valve spool modulates the flow of lubricating hydraulic fluid returning from a transmission cooler and its position is determined by a force balance between the line pressure, the regulated fluid output pressure to the lubrication system and the force of the spool biasing compression spring. In a second, reduced lubrication state, a signal from the transmission control module (TCM) opens a solenoid valve to provide high pressure hydraulic fluid to a three way check valve which closes the feedback loop and applies the high pressure fluid to the end of the valve spool biased by the biasing compression spring. This action moves the valve spool to a travel limit position, closing off flow from the cooler to the lubrication system and returning it to the sump. Lubricating hydraulic fluid from the torque converter feed is then routed to the lubrication system to satisfy the transmission lubrication requirements at lower transmission speeds.

Several orifices are disposed in various fluid flow paths to provide flow restrictions which provide improved control of fluid flow. A lubrication flow switch is provided with pressurized hydraulic fluid in the first state which is exhausted in the second state and signals the TCM that the lubrication control system is operating in the first, high flow state or the second, low flow state.

Thus it is an object of the present invention to provide a lubrication control system for an automatic transmission.

It is a further object of the present invention to provide a lubrication control system for an automatic transmission having a spool valve and a three way check valve.

It is a still further object of the present invention to provide a lubrication control system for an automatic transmission having a spring biased spool valve and a three way check valve.

It is a still further object of the present invention to provide a lubrication control system for an automatic transmission having a first larger flow orifice for higher speed operating conditions and a second smaller flow orifice for lower speed operating conditions.

It is a still further object of the present invention to provide a lubrication control system for an automatic transmission having a pressure switch which provides a signal to a transmission control module regarding the state of operation of the lubrication control system.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
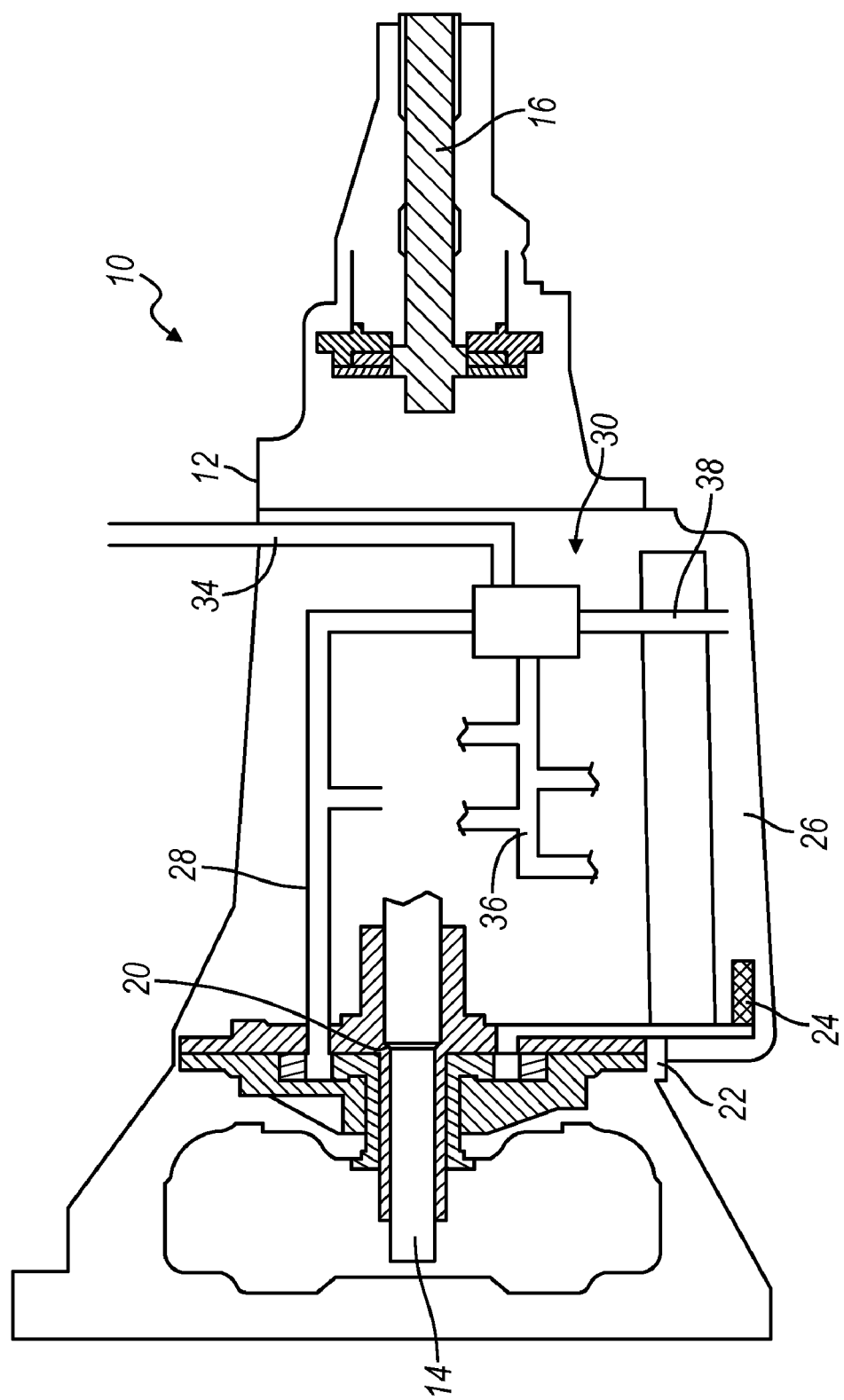
FIG. 1 is a diagrammatic view of an automatic transmission incorporating the lubrication control system of the present invention.

With reference now to FIG. 1, an exemplary automatic transmission is illustrated and generally designated by the reference number 10. The automatic transmission 10 includes a cast metal housing 12 having various openings, surfaces, flanges and passageways which receive, locate and support the numerous components of the automatic transmission 10. Among these components are an input shaft 14 and an output shaft 16. Supplied with rotational power from a component of the automatic transmission 10 is a hydraulic fluid pump 20. Typically, the hydraulic pump 20 will be a gerotor or gear pump coupled to an inlet or suction line 22 which draws hydraulic fluid through a filter 24 disposed in a sump 26 at the bottom of the housing 12 of the automatic transmission 10.

The hydraulic pump 20 supplies hydraulic fluid under pressure in an outlet or supply line 28 to various components within the automatic transmission 10 such as a pressure regulator (not illustrated) and a lubrication control assembly 30 disposed within the housing 12 of the automatic transmission 10. The lubrication control assembly 30 also receives pressurized hydraulic fluid from a cooler 32 (illustrated in FIG. 2) in a return line 34. The cooler 32 is typically located remotely from the automatic transmission 10 in a heat absorbing medium. The hydraulic fluid output of the lubrication control assembly 30 is provided to a lubrication manifold 36 which is essentially a plurality of lines or passageways which distribute the hydraulic fluid to various components of the automatic transmission 10. A sump return line 38 returns hydraulic fluid not provided to the lubrication manifold 36 to the sump 26.

Figure 2:
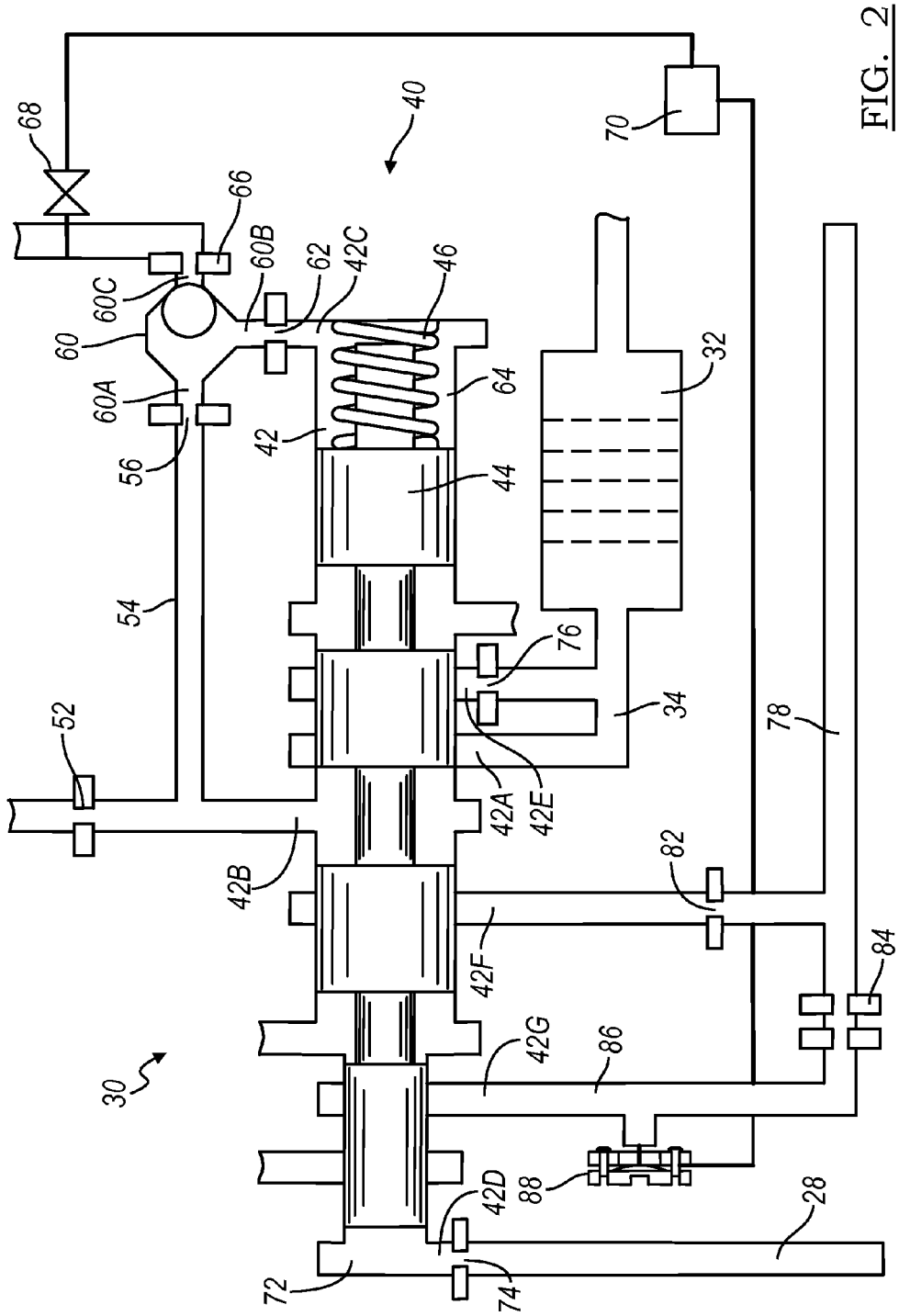
FIG. 2 is a schematic view of a lubrication control system for an automatic transmission according to the present invention in a normal flow, i.e., higher speed, operating state.

Referring now to FIGS. 1 and 2, the lubrication control assembly 30 according to the present invention includes a multiple port spool or control valve 40 including a housing or valve body 42 which slidably receives a multiple piston or land valve spool 44. As illustrated in FIG. 2, the valve spool 44 is in a first, modulating or operating high volume position in which it supplies a volume flow rate of pressurized hydraulic fluid to the lubrication manifold 36 of the automatic transmission 10 associated with high operating speeds. The valve spool 44 is biased to a second, low flow or at rest position to the left in the valve body 42 by a compression spring 46.

The valve body 42 defines a first, inlet port 42A which receives hydraulic fluid in the return line 34 from the transmission cooler 32. In the first or high volume modulating position of the valve spool 44, the pistons or lands of the valve spool 44 direct the hydraulic fluid to a first outlet port 42B which communicates with a first high volume supply orifice 52 sized to provide a volume rate of flow of hydraulic fluid sufficient to satisfy the requirements of the automatic transmission 10 at higher speeds. The output of the high volume orifice 52 flows to the lubrication manifold 36. Hydraulic fluid flow from the first outlet port 42B is also provided through a line 54 and a first control orifice 56 to a first port 60A of a three way check valve 60. The second port 60B of the three way check valve 60 is connected through a second control orifice 62 to a first control port 42C of the valve body 42. The first control port 42C communicates with a first control chamber 64 which contains the compression spring 46. A third port 60C of the three way check valve 60 communicates through a third control orifice 66 with a control valve 68 actuated by the transmission control module (TCM) 70. As will be explained in more detail below, when low speed and reduced lubrication requirements are sensed, the transmission control module 70 provides an override signal which actuates the control valve 68 which, in turn, provides pressurized hydraulic fluid to the third port 60C of the three way check valve 60.

A second control port 42D communicating with a second control chamber 72 at the end of the valve spool 44 opposite the first control chamber 64 is connected to the outlet or supply line 28 of the hydraulic pump 20 through a fourth control orifice 74. The pressure in the second control chamber 72 will vary with the speed of the hydraulic pump 20 and other variables and may typically range from 300 to 2100 kPa.

It will thus be appreciated that the axial position of the valve spool 44 and the hydraulic fluid flow to the lubrication manifold 36 will be the result of a force balance between the pump pressure within the second control chamber 72 tending to translate the valve spool 44 to the right in FIG. 2 and the feedback pressure in the line 54, the three way check valve 60 and the first control chamber 64, combined with the force of the compression spring 46 which together tend to translate the valve spool 44 to the left.

The multiple port spool or control valve 40 includes additional ports which are not involved in the normal, regulated operating state. They include a second inlet port 42E which is adjacent the first inlet port 42A and which receives hydraulic fluid flow through a fifth control orifice 76 from the return line 34. A torque converter feed line 78 provides hydraulic fluid through a second low volume supply orifice 82 and thence to a third inlet port 42F. A sixth control orifice or pair of orifices 84 also provide hydraulic fluid from the torque converter feed line 78 through another feed line 86 to a lubrication pressure switch 88 and a fourth inlet port 42G. The lubrication pressure switch 88 provides a signal to the transmission control module 70 that relatively high pressure exists in the feed line 86 which indicates that the fourth inlet port 42G is closed, thus confirming to the transmission control module 70 that the valve spool 44 is in its normal, regulated operating position.

Figure 3:
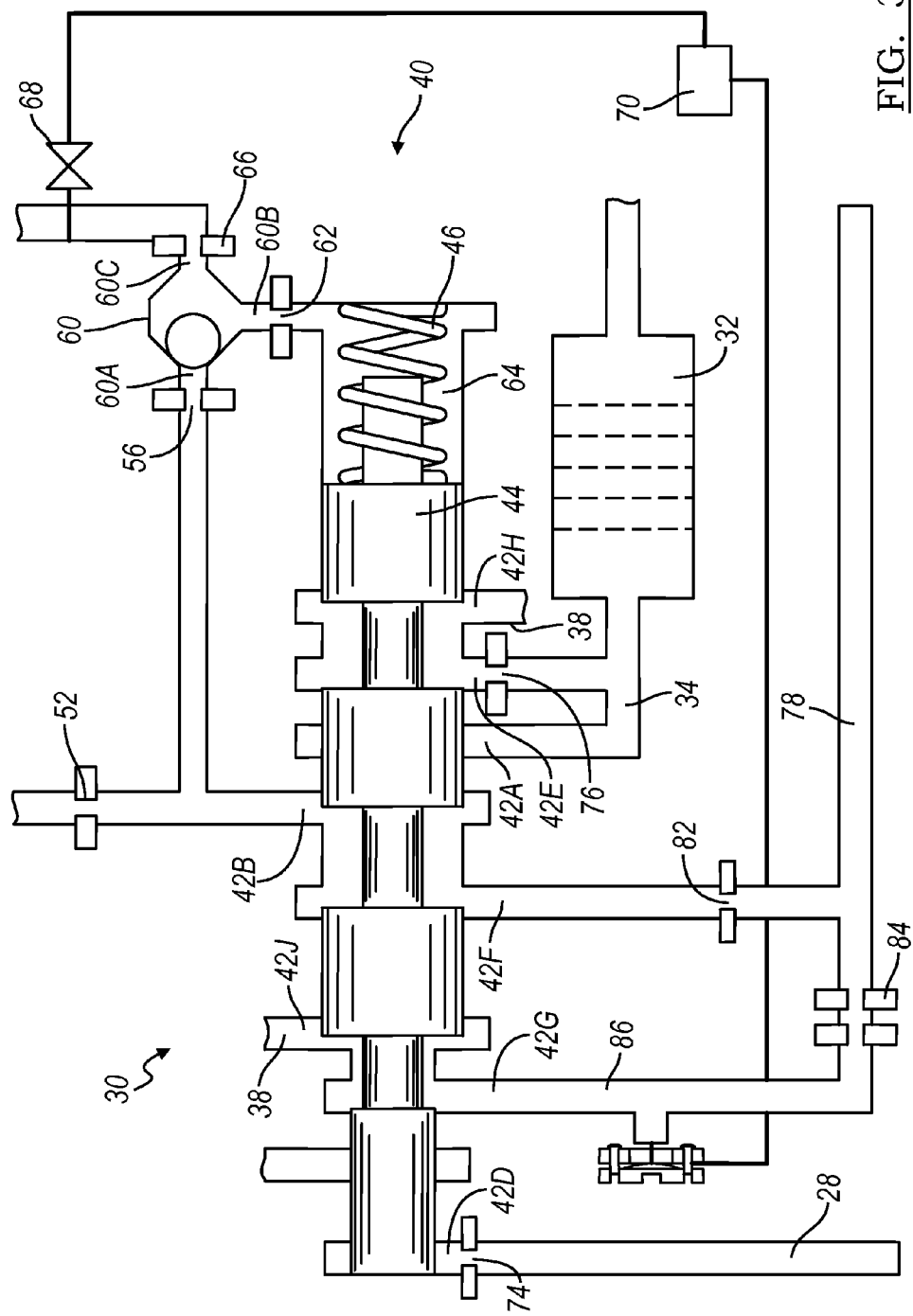
FIG. 3 is a schematic view of a lubrication control system for an automatic transmission according to the present invention in a reduced flow, i.e., lower speed, operating state.

Referring now to FIG. 3, the reduced lubrication flow operating state of the lubrication control assembly 30 is illustrated. It will be apparent that in this operating state, the valve spool 44 has moved to its leftmost limit of travel as illustrated in FIG. 3. This translation has occurred as a consequence of the transmission control module 70 sensing operating conditions in which reduced lubrication flow is appropriate. In this situation, the transmission control module 70 provides a signal to the control valve 68 to open it, thereby providing pressurized hydraulic fluid through the third control orifice 66 to the third port 60C of the three way control valve 60. The ball check thus moves to close off the port 60A and the hydraulic fluid flows through the second control orifice 62 and fills the first control chamber 64. The combined force of the hydraulic fluid and the compression spring 46 cause the valve spool 44 to translate to its full, left travel limit.

In this position, the lands of the valve spool 44 provide communication between the third inlet port 42F and the first outlet port 42B. The second low volume supply orifice 82 is significantly smaller than the first high volume supply orifice 52 and thus the flow of hydraulic fluid to the lubrication manifold 36 is significantly reduced. Also in this position of the valve spool 44, the second inlet port 42E is in communication with a first exhaust port 42H and the sump return line 38 which returns hydraulic fluid from the cooler 32 to the sump 26. This feature ensures that full cooler flow and thus maximum cooling are available at all times, regardless of the quantity of fluid passing through the lubrication manifold 36. Finally, the lands of the valve spool 44 provide communication between the fourth inlet port 42G and a second exhaust port 42J which communicates with the sump 26 through the sump return line 38. Since the sixth control orifices 84 limit the hydraulic fluid flow in the feed line 86, the pressure drops and the lubrication pressure switch 88 changes state, indicating to the transmission control module 70 that the lubrication control assembly 30 and specifically the valve spool 44 is operating in its reduced flow state.

Figure 4:
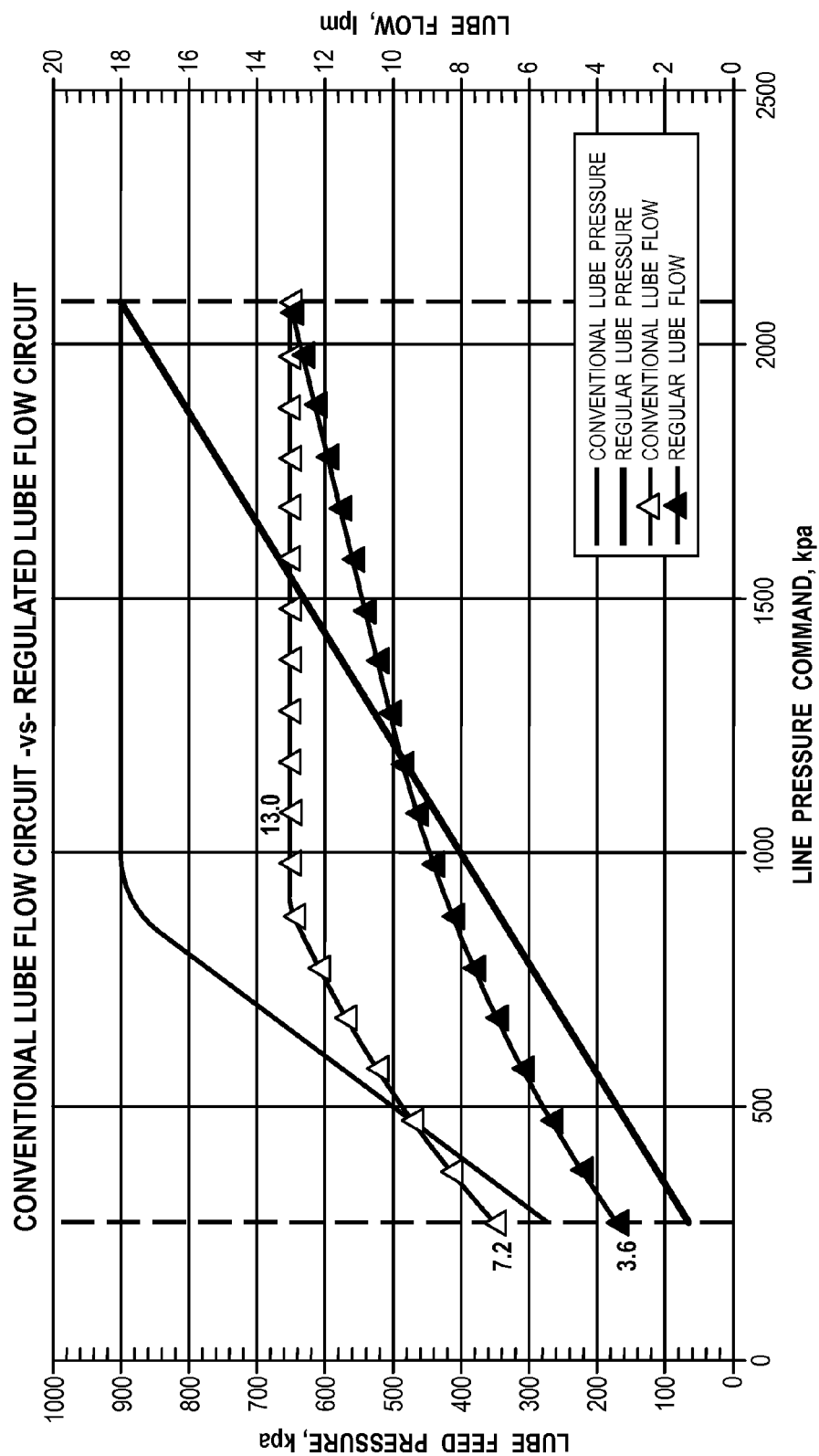
FIG. 4 is a graph presenting operating conditions in a conventional automatic transmission lubrication circuit versus a transmission lubrication circuit according to the present invention.

Referring now to FIG. 4, plots of various operating conditions in a conventional automatic transmission lubrication circuit versus a transmission lubrication circuit according to the present invention are presented. The X (horizontal) axis delineates increasing line pressure, that is, hydraulic pressure in the outlet or supply line 28 from the hydraulic pump 20. The left Y (vertical) axis presents increasing lubrication feed pressure to the lubrication manifold 36 and the right Y (vertical) axis presents actual hydraulic fluid flow in liters per minute.

The lubrication control system according to the present invention provides several advantages over prior art systems. First of all, it is estimated that reducing hydraulic fluid flow during low power operation may achieve a 1% improvement in fuel economy. Second of all, all hydraulic fluid, whether is it used for lubrication or is bypassed directly back to the sump, passes through the transmission cooler. Thus, maximum transmission fluid cooling is always provided. Last of all, unless the control valve 68 is activated, the normal and fail-safe operating condition is higher volume, regulated flow lubrication. In this regard, the lubrication pressure switch 88 confirms to the transmission control module 70 correspondence between commanded and actual operating conditions.

The description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A lubrication control system for an automatic transmission comprising, in combination,
    a multiple port spool valve having a valve spool disposed in a valve body, a first control port in said body for providing fluid to one end of said valve spool, a spring for biasing said valve spool away from said first port, a second control port in said body for providing fluid to an opposite end of said valve spool, a first inlet port, a first outlet port communicating with a first, larger fluid orifice, a second inlet port communicating with a second, smaller fluid orifice, and a first exhaust port communicating with a sump,
    a control valve for selectively providing pressurized fluid,
    a three way check valve communicating with said first outlet port, said first control port and said control valve, whereby pressurized fluid is provided by said control valve through said three way check valve to said first control port,
    whereby pressurized fluid provided to said second control port modulates a fluid flow between said first inlet port and said first outlet port when said control valve is closed and a fluid flow is established between said second inlet port and said first outlet port when said control valve is open.

2. The lubrication control system of claim 1 further including an orifice disposed between said three way check valve and each of said first outlet port, said first control port and said control valve.

3. The lubrication control system of claim 1 further including a third inlet port communicating with an orifice, said third inlet port communicating with said first exhaust port when said control valve is open.

4. The lubrication control system of claim 1 further including a pressure sensing switch communicating with a fourth inlet port and said second inlet port through an orifice.

5. The lubrication control system of claim 1 wherein said spring is a compression spring.

6. The lubrication control system of claim 1 further including a lubrication manifold of an automatic transmission.

7. The lubrication control system of claim 1 further including a transmission cooler in fluid communication with said first inlet port.

8. A lubrication control system for an automatic transmission comprising, in combination,
    a control valve for selectively providing pressurized fluid,
    a multiple port spool valve having a valve body, a valve spool disposed in said body for movement between a modulating position and a limit position, a first control port for providing fluid to a first end of said valve spool and a second control port for providing said fluid to second end of said valve spool, means for biasing said valve spool to said limit position, a first inlet port, a first outlet port communicating with a larger fluid orifice, a second inlet port communicating with a smaller fluid orifice, and
    a three way check valve communicating with said first outlet port, said first control port and said control valve, whereby said valve spool modulates a flow of fluid from said first inlet port to said first outlet port when said control valve is closed and provides a flow of fluid from said second inlet port to said first outlet port when said control valve is open.

9. The lubrication control system for an automatic transmission of claim 8 further including a lubrication manifold in fluid communication with said first outlet port.

10. The lubrication control system for an automatic transmission of claim 8 wherein said valve body further includes a third inlet port in fluid communication with said first inlet port through a third orifice and an exhaust port communicating with a sump.

11. The lubrication control system for an automatic transmission of claim 8 further including a fluid pressure switch in fluid communication with said second inlet port and a fourth inlet port through a fourth orifice.

12. The lubrication control system for an automatic transmission of claim 11 further including a transmission control module having an input for receiving a signal from said fluid pressure switch and an output for controlling said control valve.

13. The lubrication control system for an automatic transmission of claim 11 further including a second exhaust port and wherein said fourth inlet port communicates with said second exhaust port when said control valve is open.

14. The lubrication control system for an automatic transmission of claim 8 wherein said means for biasing is disposed proximate said first control port.

15. The lubrication control system for an automatic transmission of claim 8 wherein said means for biasing is a compression spring.

16. The lubrication control system for an automatic transmission of claim 8 further including a transmission cooler having an output in fluid communication with said first inlet port.

17. The lubrication control system for an automatic transmission of claim 8 further including an orifice disposed between said three way check valve and each of said first outlet port, said first control port and said valve.

18. The lubrication control system for an automatic transmission of claim 8 wherein said valve spool includes four lands.

* * * * *